United States Patent

Provenzola

[11] Patent Number: 5,548,016
[45] Date of Patent: Aug. 20, 1996

[54] WATER-BORNE FLEXIBLE PARTS PRIMER

[75] Inventor: Robert M. Provenzola, Milford, Mich.

[73] Assignee: Tremco, Inc., Beachwood, Ohio

[21] Appl. No.: 221,290

[22] Filed: Mar. 31, 1994

[51] Int. Cl.$^6$ ..................................................... C08L 75/00
[52] U.S. Cl. ......................... 524/507; 524/449; 524/451
[58] Field of Search ..................................... 524/507, 449, 524/451

[56] References Cited

U.S. PATENT DOCUMENTS

| | | |
|---|---|---|
| 3,360,494 | 12/1967 | Bolinger . |
| 3,862,074 | 1/1975 | Hickey . |
| 4,103,050 | 7/1978 | Laskin et al. . |
| 4,225,477 | 9/1980 | Vasishth et al. . |
| 4,298,511 | 11/1981 | Schimmel et al. . |
| 4,339,365 | 7/1982 | Becher et al. . |
| 4,430,367 | 2/1984 | Lat . |
| 4,507,426 | 3/1985 | Blake, Jr. . |
| 4,522,958 | 6/1985 | Das et al. . |
| 4,526,910 | 7/1985 | Das et al. . |
| 4,880,867 | 11/1989 | Gobel et al. . |
| 4,927,876 | 5/1990 | Coogan et al. ........................ 524/457 |
| 4,968,536 | 11/1990 | Goldner et al. . |
| 5,011,881 | 4/1991 | Fujii et al. ............................. 524/457 |

Primary Examiner—Edward J. Cain
Attorney, Agent, or Firm—David P. Dureska; Samuel B. Laferty; Gunther J. Evanina

[57] ABSTRACT

A primer composition for adhering a topcoat to a flexible plastic substrate includes a blend of acrylic and urethane resins, and pigments dispersed in a water based solvent system. About 10 to about 20 percent of the resins are polyurethene by weight, the balance of the resins consisting essentially of acrylic polymers. The composition consists of from about 15 to 30 percent resins, and from about 20 to about 35 percent pigments by weight, and has a total solids content of from about 35 to about 70 percent. The water based solvent system is primarily water, but contains water-miscible organic components which provide for rapid drying, and good coalescing and film forming properties, while minimizing volatile organic content. The compositions dry rapidly at ambient conditions upon application to flexible plastic substrates to provide a continuous, flexible film which exhibits excellent adhesion with the substrate and with subsequently applied topcoats.

20 Claims, No Drawings

WATER-BORNE FLEXIBLE PARTS PRIMER

FIELD OF THE INVENTION

This invention relates to a water-borne polymeric coating composition, and more particularly to a water-borne polymeric composition for coating flexible plastic substrates.

BACKGROUND OF THE INVENTION

Various automotive components such as body panels, moldings, bumpers, and like are increasingly being fabricated from flexible plastics such as by reaction injection molding, compression molding of sheet molding compounds and injection molding of thermoplastic elastomers, etc. These flexible plastic automotive parts are generally provided with a smooth high gloss finish or top coat which is adhered to the flexible plastic part by an intervening primer or base coat. Such primer compositions should exhibit a number of desirable characteristics. In particular the primer composition should have good sprayability and flow properties, and be capable of quickly drying to form a flexible, opaque film having properties such as smoothness and chemical resistance which provide a base onto which a subsequent top coat having good reflective clarity and distinctness of image can be formed. The film must also exhibit excellant adhesion to the flexible plastic substrate and to a subsequently applied top coat. In order to reduce environmental health risks, the primer composition should preferably have a low volatile organic content. Additionally the primer composition should be capable of drying to form a base coat which exhibits good sandability properties, particularly when used during the repair of flexible plastic parts which have been damaged such as in a collision.

Various aqueous based or water-dispersable polymeric coating compositions containing acrylic and urethane type polymers are known to the art and described in the literature. However, none of the known compositions are specifically adapted for use as a primer coat for flexible plastic substrates. Specifically, the prior art compositions do not simultaneously exhibit all of the qualities which are desirable for a primer coating composition for flexible plastic substrates.

U.S. Pat. No. 3,360,494 to Bolinger, for example, discloses a textile size composition containing a water-soluble acrylic type polymer and a water-soluble polyurethane carried in an aqueous medium. This composition is unsuitable for use as a coating composition on account of its low solids content. Moreover Bolinger discloses a heat cured composition which is not suitable for air drying at ambient conditions.

U.S. Pat. No. 3,862,074 to Hickey relates to an aqueous dispersion of one or more acrylic polymers and one or more urethane polymers. This composition is disclosed as being suitable for use as a primer for metal and other materials. The disclosed compositions however do not simultaneous achieve all of the desired characteristics such as flexibility, opacity, good top coat hold out, and other desirable film forming characteristics, good sandability, and other properties which are desirable for a primer coating composition for flexible plastic substrates.

Various other references such as U.S. Pat. Nos. 4,103,050 to Laskin et al.; 4,298,511 to Schimmel et al; 4,339,365 to Becher et al; 4,430,367 to Lat; 4,507,426 to Blake Jr.; 4,522,958 and 4,526,910 to Das et al; 4,880,867 to Gobel et al; 4,927,876 to Coogan et al; 4,968,536 to Goldner et al; and 5,011,881 to Fujii et al disclose aqueous or water-based coating compositions containing an acrylic type polymer and a urethane type polymer. None of the foregoing references however teach all of the essential features such as total solids content, total resin content, ratio of urethane polymer to acrylic polymer, appropriate pigments and organic co-solvents, and other characteristics needed to simultaneously achieve good sprayability and flow properties, rapid air drying at ambient conditions, flexibility, opacity, appropriate coalescent and film forming properties, good adhesion to both the substrate and top coat, good sandability, the ability to fill scratches and minor imperfections in the substrate, and other properties which are desirable for a primer composition intended for application to a flexible plastic substrate, while simultaneously achieving a relatively low volatile organic content.

SUMMARY OF THE INVENTION

The present invention provides for a water-borne polymeric coating composition containing a combination of film forming resins and pigments dispersed in an aqueous based solvent system. The amounts and types of resins, pigments, and solvents are selected to provide a composition which is particularly well suited for use as a primer for flexible plastic substrates.

The resins, which generally comprise from about 15 to about 30 percent by weight of the composition, include at least one water-dispersable acrylic type resin and at least one water-dispersable polyurethane resin. In order to provide a good balance between film flexibly and air drying time, the urethane polymer generally comprises from about 10 to about 35 percent of the total resin content of the composition. The balance of the resin content is generally comprised of one or more acrylic type polymers.

Pigments in the from of powdered or granular inorganic solids are present in the composition in amounts ranging from about 20 percent to about 35 percent by weight of the total composition. The pigments allow good film formation properties, enhance sandability and help fill scratches and other minor imperfections on the substrate, and generally provide improved dimensional stability, durability, and reduced cost. The amount of pigments relative to the resins or binders is important for maintaining good adhesion under stressed conditions. The pigments may also provide for improved impermeability and better impact resistance. A particularly preferred pigment is talc or hydrated magnesium silicate having a plate-like morphology. The pigments and resins together provide for a total solids content of from about 35 percent to about 70 percent.

The resins and pigments are dispersed in an aqueous solvent system comprised of water and water-miscible organic solvents. The organic solvents are generally present in amounts ranging from about 10 percent to about 25 percent by weight of the aqueous solvent system. The organic, water-miscible solvents are utilized in amounts which are effective to achieve good resin coalescence or film forming properties, promote film formation, and desirably to improve pigment dispersion in the composition and to provide greater flexibility of resin films formed from the composition, while minimizing volatile organic content.

The water-borne polymeric coating compositions of the invention exhibit properties and characteristics which are highly desirable for primer coatings which are to be used on flexible plastic substrates. The compositions of the invention have excellence flow properties and can be easily applied to a substrate such as by using a roller or brush, dipping, flowcoating, spraying, knifecoating, or electrostatic coating.

The compositions of the invention rapidly dry at ambient conditions to form smooth films. Films formed from the compositions of the invention are also highly flexible to withstand subsequent bending or flexing of the substrate. The films also provide good adhesion with the substrate and with a subsequently applied topcoat. During application of the coating compositions of the invention, the pigments contained therein tend to fill scratches and other minor surface imperfections to provide a smooth surface for application of the topcoat. Additionally, the pigments contained in the compositions of the invention provide good sandability characteristics which allow sanding and smoothing of a primed surface without damaging or removing excessive material from the primer film.

DESCRIPTION OF THE PREFERRED EMBODIMENTS

The water-borne coating compositions in accordance with the invention comprise at least one water-soluble or water-dispersable acrylic type resin, at least one water-soluble or water-dispersable urethane type resin, and one or more pigments, all of which are dispersed in a water based solvent system containing minor amounts of organic solvents which are miscible with water.

Suitable acrylic resins for use with the invention general include any of the well known addition homopolymers and co-polymers of acrylic and methacrylic acids and their esters, acrylamide and methacrylamide, and acrylonitrile and methacrylonitrile. Examples of esters of acrylic and methacrylic acids include alkyl acrylates and alkyl methacrylates such as ethyl acrylate or methacrylate, methyl acrylate or methacrylate, propyl acrylate or methacrylate, ethylhexyl acrylate or methacrylate, and lauryl acrylates and methacrylates and the like. Other monomers which can be employed in the acrylic polymer include hydroxyalkyl esters such as 2-hyroxyethylacrylate, 2-hyrdroxypropyl acrylate, 2-hydroxyethyl methacrylate, 2-hydroxypropyl methacrylate, 3-hydroxypropyl-4-hydroxybutyl methacrylate, and the like as well as mixtures thereof. Still other monomers which can be employed in the acrylic copolymer include $\alpha,\beta$-unsaturated dicarboxylic acids or semi-esters thereof, such as maleic acid or the like. Still other ethylenically unsaturated monomers which can be utilized in the preparation of acrylic resins include vinyl substituted aromatic compounds and esters of organic and inorganic acids. Suitable vinyl substituted aromatics include styrene, $\alpha$-methyl styrene, vinyl toluene, $\alpha$-chlorostyrene, $\alpha$-bromostyrene, o-methyl styrene and the like. Suitable vinyl esters of organic and inorganic acids include vinyl acetate, vinyl propylanate, isopropenyl acetate, and the like. Monomers such as vinyl chloride, allyl chloride, and non-aromatic monoolefinic and dioolefinic hydrocarbons optionally bearing halogen substituents such as isobutylene, 2-3-dimethyl-1-hexene, 1,3-butadiene, chloroethylene, chlorobutadiene and the like can be used in the preparation of acrylic polymers.

The acrylic polymer used in the invention can either be a water-soluble acrylic resin or, more preferably, an acrylic resin which is dispersable in an aqueous emulsion. Suitable water-soluble acrylic resins are generally those having an acid value in the range of from about 20 to about 150. Aqueous solutions of water-soluble acrylic resins can be prepared by neutralizing the carboxyl groups of the water-soluble acrylic resin with any of various neutralizing agents such as ammonia and water-soluble amino compounds including monoethylamine, ethylamine, dimethylamine, dipropylamine, disopropylamine, triethylamine, buryamine, methyl ethyl amine, diethyl ethanylamine, morpholine, and the like.

Emulsions containing acrylic resin particles uniformly dispersed in an aqueous medium can be obtained by subjecting an acrylic monomer to emulsion polymerization in an aqueous solution of a dispersion stabilizer. Examples of dispersion stabilizers useful in the polymerization are polyoxyethylene, nonyl, phenyl and like nonionic surfactants, polyoxyethylene alkyl allyl ether sulfuric acid ester salt and like anionic surfactants.

Acrylic polymers can be produced by any of various well-known bulk, suspension, emulsion, and solution polymerization techniques generally involving a free radical process utilizing peroxygen compounds especially inorganic persulfate compounds such as ammonium persulfate, potassium persulfate, sodium persulfate; peroxide compounds such as hydrogen peroxide; organic hydroperoxides, such as cumene hydroperoxide, t-butyl hydroperoxide; organic peroxides such as benzoperoxide, acetoperoxide, lauryl peroxide, peracetic acid and perbenzoic acid; as well as other free radical producing materials such as 2,2'-azo-bis-isobutyronitrile.

Optionally, chain transfer agents such as carbon tetrachloride, bromoform, bromotrichloromethane, long chain alkyl mercaptans and thioesters such as n-dodecyl mercaptan, t-dodecyl mercaptan, octyl mercaptan, and the like may be utilized in amounts up to about 10 parts per 100 parts of polymerizable monomers.

Combinations of one or more acrylic polymers as set forth above may be utilized in the compositions of the invention.

The polyurethane resin component is either a water-soluble polyurethane or, more preferably, a water-dispersable polyurethane.

Generally any water-soluble polyurethane is suitable with use of the invention. Examples of water-soluble urethane polymers include the reaction product of a diisocyanate and a polyalkylene ether glycol preferably having a molecular weight of from about 2,000 to 20,000. Generally about 1 to about 1.5 moles of diisocyanate are reacted with each mole of glycol. The reaction between the diisocyanate and the glycol can be abruptly halted at a point short of water insolubility, preferably by the addition of an aliphatic monohydroxy alcohol which reacts with isocyanate radicals to block further reaction with the glycol. Suitable polyalkylene ether glycols include ethylene glycol, propylene glycol and tetramethylene oxide. Suitable diisocyanates for this reaction include 2,4-toluene diisocyanate, m-phenyl diisocyanate, 4-chloro-1, 3-phenyl diisocyanate, naphthalene-1,5-diisocyanate and the like.

Other suitable water-soluble polyurethanes include modified polyurethanes wherein the foregoing polyalkylene ether glycol diisocyanate polymer is reacted with an epoxide to block the amine group.

Water-soluble polyurethanes which can be used in the practice of the invention are, for example, described in U.S. Pat. No. 3,360,494 to Bolinger, which is hereby incorporated by reference herein.

Water-dispersable polyurethanes suitable for use with the invention include those which can be dispersed in water by use of an external dispersing or emulsifying agent such as a surface active agent of a cationic, anionic or nonionic type. Alternatively, water-dispersable polyurethanes which can be used in the practice of the invention include, for example, anionic polyurethane dispersions preferable having an acid number of from about 5 to about 50 based on the solids content. Preparation of anionic polyurethane dispersions are carried out in the usual manner such as by chain lengthening of a prepolymer containing isocyanate end groups, after neutralization of its acid groups by emulsification in water with polyamines and/or hydrazine. In this process, either all the isocyanate groups react with diamines or, if relatively high molecular weight polymers or mixtures thereof are used, amine nitrogen atoms carrying reactive hydrogen may be left over. Polyurethane dispersions containing urea groups are preferably prepared. This process gives rise to products which have improved dispersability, i.e. the polyurethanes formed can be dispersed in water with a relatively small number of acid salt groups and form an organic phase consisting of fine particles.

The prepolymers containing isocynate groups may be prepared by the reaction of polyhydric alcohols having a hydroxyl number of 10 to 1800 with excess poly isocyanates at temperatures of up to 150° C. in organic solvents which are incapable of reacting with isocyanates. The equivalent ratio of NCO groups to OH groups lies in the range of from about 1.5 to 1 to 1 to 1. Because of their greater flexibility, relative high molecular weight straight chained polyols having a hydroxyl number of from about 30 to about 150 are preferred.

Other polyurethanes which are either water-soluble or water-dispersable are generally described in for example U.S. Pat. No. 3,148,173 to Axelrod; U.S. Pat. No. 3,294,724 to Axelrod; U.S. Pat. No. 3,401,133 to Grace; U.S. Pat. No. 3,410,817 to McClellan; and others.

Preferred urethane polymers include the reaction products of diisocyanates and polyisocyanates with polyether and polyester diols and polyols. Especially preferred are polyurethanes which are the reaction product of polyether glycols, particularly polytetramethylene oxide, and diisocyantes.

The aqueous based solvent system consist primarily of water containing from about 10 percent to about 25 percent by weight of water-miscible, organic solvents based on the total weight of the water based solvent system. The organic solvents used in the invention are generally miscible with both the acrylic and the urethane resins as well as with water. Suitable water-miscible organic solvents include alkoxyglycols, Carbitol™ and Carbitol™ derivatives, alkyl and alkyl ether derivatives of glycols, water-miscible heterocyclic compounds and the like. The water-miscible organic solvents act as coalescing agents for the resins and are generally essential for achieving a smooth continuous film. Examples of particularly preferred coalescence solvents include 2-butoxyethanol, 2-(2-butoxyethoxy) ethanol and N-methyl-2-pyrrolidone. In addition to providing for good film formation, the coalescence solvents generally provide for improved sprayability, flow, adhesion, flexibility and shorter drying time.

To achieve good firm forming characteristics, good adhesion, sandability, and the ability to fill scratches and other minor imperfections on a substrate surface, pigments in the form of powdered solids are utilized in amounts ranging from about 20 percent to about 35 percent by weight of the polymeric coating composition. The term pigments as used herein refers generally to conventional pigments, opacifiers, fillers, extenders, and the like, which are typically used in the form of powdered or granular in the coating compositions. A particularly preferred pigment for use with the invention is talc (hydrated magnesium silicate), particularly talcs having a plate-like morphology. Coating compositions containing these plate-like talcs have been found to provide for films which form a highly impermeable barrier to moisture and organic chemicals. Other pigments which can be used in the practice of the invention include barium sulfate, titanium dioxide, and carbon black. The composition should generally include at least one opacifying type pigment such as titanium dioxide or carbon black. A particularly preferred combination of pigments includes about 2 parts of hydrated magnesium silicate per part of barium sulfate along with minor amounts of an opacifying pigment which are effective to opacify said composition. The foregoing pigments generally have a particle size in the range of from about 1 to about 50 microns. In addition to promoting better adhesion, sandability and filing in scratches and other minor imperfections in the substrate surface, the foregoing pigments also provide for better film durability.

In addition to serving as a coalescing agent, 2-butoxy ethanol is believed to help disperse the pigments in the coating composition. Small amounts of other pigment dispersing agents can also be utilized as desired.

In addition to the aforementioned water-miscible organic solvents, small amounts of water-insoluble plasticizers such as dibutyl phthalate can be added to the composition. The plasticizers help improve the flexibility of the film and also assist in the coalescence of the resins.

The coating composition of the invention generally comprises from about 15 to 30 parts by weight of resins containing of one or more water-soluble or water-miscible polyurethanes and one or more water-soluble or water-miscible acrylic polymers, from about 20 to 35 parts by weight of pigments, and from about 30 to 65 parts by weight of solvent, with from about 10 percent to 25 percent by weight of the solvent being one or more water-miscible organic solvents. The polyurethane polymer or polymers are present in amounts ranging from about 10 to about 35 percent of the total weight of all polymeric resins in the composition. The balance of the resins essentially consist of one or more acrylic polymers, although minor amounts of other resins can be utilized in amounts which do not adversely affect the desired properties.

The coating compositions of the invention can be used for coating any of various substrate surfaces but is particularly useful as a primer coating for flexible plastic substrates. The coatings of the invention can be generally applied in any conventional method such as by application with brushes or rollers, flow coating, spraying, dipping, knife coating, and electrostatic coating.

TABLE I

| a) Urethane dispersion | 9.0 |
|---|---|
| b) Acrylic | 41.53 |
| c) Anti foam agent | 0.18 |
| d) 2-butoxy ethanol | 5.13 |
| e) Hydrous magnesium silicate (platy tale) | 8.69 |
| f) deionized water | 10.63 |
| g) Titanium dioxide | 3.09 |
| h) Hydrous magnesium silicate (platy talc) | 7.34 |
| i) Barium Sulfate | 7.53 |
| j) 2-butoxy ethanol | 1.73 |
| k) Dispersing agent (surfactant soap) | 0.35 |
| l) Black tinting paste | 1.03 |
| m) Aqueous ammonia | 0.11 |
| n) Amorphous silica | 0.66 |
| o) Dibutyl phthalate | 0.66 |
| p) 2-(2-butoxyethoxy) ethanol | 2.31 |

TABLE II

CROSS HATCH ADHESION OVER VARIOUS SUBSTRATES (0-5, 5 is best)

| VARIOUS FLEX COATS | THERMO-PLASTIC OLEFIN (TPO) | URETHANE REACTION INJEC-TION MOLDED (RIM) | SHEET MOLDED COMPOUND (SMC) | EXISTING FINISH URETHANE TOP COAT OVER RIM | TOTAL POINTS |
|---|---|---|---|---|---|
| HYDROFLEX ®[1] | 2.4 | 3.5 | 2.9 | 2.7 | 11.5 |
| COMPETITOR COMMERCIAL SOLVENT BASE PRIMER | 2.6 | 3.5 | 2.3 | 2.5 | 10.9 |
| TREMCO COMMERCIAL SOLVENT BASE PRIMER | 2.3 | 2.8 | 2.6 | 2.3 | 10.0 |
| HYDROFLEX ®[2] | 5.0 | 4.8 | 3.3 | 5.0 | 18.1 |

TABLE III

INTERCOAT ADHESION WITH VARIOUS TOP COATS (cross hatch, 0-5, 5 is best)

| VARIOUS FLEX COATS | SINGLE STAGE ACRYLIC URETHANE | BASE COAT CLEAR COAT ACRYLIC URETHANE | ACRYLIC LACQUER | ALKYL ENAMEL | TOTAL POINTS |
|---|---|---|---|---|---|
| HYDROFLEX ®[1] | 4.5 | 5 | 5 | 4 | 18.5 |
| COMPETITOR COMMERCIAL SOLVENT | 1.3 | 4.3 | 5 | 2.9 | 13.5 |
| TREMCO COMMERCIAL SOLVENT BASE | 3.4 | 5 | 4.3 | 2 | 14.7 |
| HYDROFLEX ®[2] | 4.8 | 5.0 | 4.8 | 4.8 | 19.4 |

Hydroflex ®[1] is a composition in accordance with the invention which has a relatively low urethane content to reduce cost.
Hydroflex ®[2] is a composition in accordance with the invention which has a relatively high urethane content to maximize adhesion and flexibility.

TABLE IV

180° FLEX (ZERO T-BEND) OVER VARIOUS SUBSTRATES (% REMOVAL)

| | SUBSTRATE | | |
|---|---|---|---|
| PRIMER TYPE | THERMOPLASTIC OLEFIN (TPO) | URETHANE: REAC-TION INJECTION MOLDED RIM | EXISTING FINISH URETHANE TOP COAT OVER RIM |
| HYDROFLEX ®[1] | TRACE | 1% | 0% |
| COMPETITOR COM-MERCIAL SOLVENT BASE | 20% | 5% | 1.5% |
| TREMCO COMMERCIAL SOLVENT BASE | TRACE | 5% | 1.5% |
| HYDROFLEX ®[2] | 4% | 5% | TRACE |

TABLE V

180° FLEX (ZERO T-BEND) WITH VARIOUS TOP COATS (% REMOVAL)

| | TOP COAT TYPE | | | |
|---|---|---|---|---|
| PRIMER TYPE | SINGLE STAGE ACRYLIC URETHANE | BASE COAT CLEAR COAT ACRYLIC URETHANE | ACRYLIC LACQUER | ALKYL ENAMEL |
| HYDROFLEX ®[1] | 0% | 100% | 15% | 7.5% |
| COMPETITOR COM- | 0% | 100% | 25% | 12.5% |

TABLE V-continued

180° FLEX (ZERO T-BEND) WITH VARIOUS TOP COATS (% REMOVAL)

| | TOP COAT TYPE | | | |
|---|---|---|---|---|
| PRIMER TYPE | SINGLE STAGE ACRYLIC URETHANE | BASE COAT CLEAR COAT ACRYLIC URETHANE | ACRYLIC LACQUER | ALKYL ENAMEL |
| MERCIAL SOLVENT BASE | | | | |
| TREMCO COMMERCIAL SOLVENT BASE | 4% | 10% | 11% | 7.5% |
| HYDROFLEX ®[2] | 0% | 0% | 0% | 7.5% |

Hydroflex ®[1] is a composition in accordance with the invention which has a relatively low urethane content to reduce cost.
Hydroflex ®[2] is a composition in accordance with the invention which has a relatively high urethane content to maximize adhesion and flexibility.

TABLE VI

| FORMULA # | BINDER % OF TOTAL SOLIDS | % URETHANE IN BINDER | CROSS HATCH ADHESION OF PRIMER | 180° C. FLEX ROOM TEMP. TOP COATED PARTS | |
|---|---|---|---|---|---|
| | | | | LIFTING AND PEELING | % REMOVAL OF PAINT FILM FROM SUBSTRATE |
| A | 38.97 | 0 | 4B | YES | 65% FAIL |
| B | 42.55 | 13.8 | 4B+ | NO | <5% FAIL |
| C | 45.86 | 24.2 | 5B | NO | <5% FAIL |
| D | 43.72 | 0 | 4B | YES | 70% FAIL |
| E | 47.78 | 0 | 3B+ | YES | 95% FAIL |
| F | 51.3 | 0 | 3B | YES | 100° F. FAIL |
| G | 37.57 | 16.9 | 5B | NO | 0% FAIL |

Conclusions: Increasing % acrylic Binder Decreasing Adhesion; substitution of urethane for acrylic significantly improves adhesion (however little additional benefit above 20% substit.); increasing % binder generally increases DOI of top coat; It is surprising the lowest binder % gave the best flexibility results.

A better understanding of the invention can be had by reference to the following non-limiting illustrative examples.

EXAMPLE 1

A coating composition in accordance with the principle of the invention was prepared using the formulation set forth in Table I. The amounts set forth in Table I are parts by weight. The coating was prepared by adding ingredients a-d from Table I to a clean container and gently mixing. Ingredient e was sifted into the container and the contents of the container were mixed at high speed to achieve a 6 Hegman grind. Ingredients f-k were separately premixed together and added to the container. Thereafter, components a-k were mixed at high speed to achieve a 5 Hegman grind. Component 1 was then added with moderate mixing. The pH was then adjusted to about 8.0-8.5 by adding the aqueous ammonia. After the pH adjustment, ingredients m-p were added and mixed with the other ingredients at high speed to achieve a 5H Hegman grind.

The adhesion characteristic and coating flexibility of the composition were tested on various substrates and compared with the properties of two commercially available solvent based primer compositions. Adhesion to various substrates was determined using ASTM-D-3359 (method B) standard test method for measuring adhesion. The composition of the invention ("Hydroflex") was prepared as set forth above and in Table I. The substrate adhesion results, set forth in Table II, show that the low VOC coating of the invention generally achieves better adhesion to a variety of substrates. Intercoat adhesion (i.e., adhesion to a subsequently applied top coat) of the primer coating of the invention was determined for various top coats using ASTM-D-3359 (method B) and compared with the two commercially available solvent based primer compositions. The results, set forth in Table III, show that the low VOC coating of the invention ("Hydroflex") generally achieves better intercoat adhesion with various top coats.

Coating flexibility of the low VOC primer of the invention on various substrates was determined and compared with the two commercially available solvent based primers using ASTM-D-4145-83 standard test for determining coating flexibility. The test involves bending a coated substrate 180°, applying an adhesive tape to the 180° bend and determining how much of the coating is removed or parted from the substrate. Lower values, corresponding to very little loss of coating from the substrate, are desired. The results, set forth in Table IV, show that the primer of the invention has much better flexibility than the commercially available primer compositions.

Removal or parting of various subsequently applied to top coats to primed RIM substrates was also determined and compared with the two commercially available solvent based primer compositions using ASTM-D-4145-83 test method. The results, set forth in Table V, show that the top coat removal when the primer of the invention is used, is generally comparable or better than when the commercially available primers are used.

EXAMPLE 2

To demonstrate the unexpected improvement of adhesion and flexibility which is achieved by utilizing a combination of acrylic and polyurethane resins in the primer coating compositions of the invention compositions containing varying amounts of total resin (binder) and varying amounts of urethane resin as set forth in Table VI were prepared. The compositions A-G were otherwise essentially the same as the composition ("Hydroflex") set forth in Example I and Table I. The various compositions were tested for adhesion in accordance with ASTM-D-3359 (method B) and for top coat parting in accordance with ASTM-D-4145-83 (flex test). The results show that regardless of the acrylic resin content, compositions without the polyurethane component (A, D, E and F) did not exhibit satisfactory flex test results (65%–100% failure), whereas those compositions containing the polyurethane component (B, C an G) all achieved good flex test results (0–5% failure) regardless of the total resin (binder) content. The compositions of the invention did not show any visible lifting or peeling when subjected to the flex test whereas those which did not contain the polyurethane component did exhibit visible lifting and peeling. The compositions of the invention also exhibited better adhesion to the ASTM-D-3359 method.

While in accordance with the patent statutes the best mode and preferred embodiment has been set forth, the scope of the invention is not limited thereto, but rather by the scope of the attached claims.

What is claimed is:

1. A water-borne polymeric coating composition, comprising:
a blend of polymeric resins and pigments dispersed in a water based solvent system, said resins including a water soluble or water-miscible polyurethane and a water soluble or water-miscible acrylic polymer, said resins comprising from about 10 to about 35 percent polyurethane by weight, the balance of said resins consisting essentially of one or more acrylic polymers, said resins comprising from about 15 to about 30 percent of said coating composition by weight, said pigments comprising from 20 to about 35 percent of said coating compositions by weight and including talc, said water based solvent system consisting essentially of water and water-miscible organic coalescing solvents, said water-miscible organic coalescing solvents comprising from about 10 to about 25 percent of the weight of said water based solvent system, said coating composition having a total solids content of from about 35 to about 70 percent and wherein said coating composition forms a continuous film at ambient temperature.

2. The composition of claim 1, wherein said one or more acrylic polymers are homopolymers or copolymers of one or more monomers comprising acrylic acid, methacrylic acid, alkyl ester of acrylic or methacrylic acid, acrylamide, methacrylamide, acrylonitrile, or methacrylonitrile, or combinations thereof.

3. The composition of claim 2, wherein said copolymers include as a comonomer hydroxyalkyl ester of acrylic or methacrylic acid, $\alpha,\beta$-unsaturated dicarboxylic acid or a semi-ester thereof, vinyl substituted aromatic, vinyl ester, or a mono- and dioolefinic hydrocarbon optionally bearing halogen substituents or combinations thereof.

4. The composition of claim 2, wherein said one or more acrylic polymers, are water-soluble acrylic polymers having an acid value in the range from about 20 to about 150.

5. The composition of claim 2, wherein said one or more acrylic polymers are dispersed in said water based solvent system by means of surface active agents.

6. The composition of claim 1, wherein said polyurethane is the reaction product of a diisocyanate and a polyether or polyester polyol.

7. The composition of claim 1, wherein said polyurethane is the reaction product of a diisocyanate and polytetramethylene oxide diol.

8. The composition of claim 6, wherein said polyether or polyester polyols have molecular weights ranging from about 2,000 to about 20,000.

9. The composition of claim 1, wherein said water-miscible, organic coalescing solvents comprise one or more alkoxy glycols, alkyl and alkyl ether derivatives of glycols, or water-miscible heterocyclic compounds or combinations thereof.

10. The composition of claim 9, wherein said one or more alkoxy glycols comprise the majority of said organic coalescing solvents by weight.

11. The composition of claim 9, wherein butoxyethanol comprises the majority of said organic coalescing solvents by weight.

12. The composition of claim 1, wherein said talc has a plate-like morphology and said pigments further comprise a minor amount of opacifying pigment.

13. The composition of claim 12, wherein said opacifying pigment is titanium dioxide, carbon black, or a combination thereof.

14. The composition of claim 13, further containing barium sulfate.

15. The composition of claim 12, further comprising barium sulfate wherein said barium sulfate is present in an amount of about 1 part per 2 parts of talc.

16. The composition of claim 1, further comprising a pigment dispersing agent which is present in an amount effective to stably disperse said pigments in said composition.

17. The composition of claim 16, wherein said dispersing agent 2-butoxy ethanol.

18. The composition of claim 1, further comprising a plasticizer which is present in an amount effective to impart improved flexibility to a film formed by said composition.

19. The composition of claim 18, wherein said plasticizer is dibutyl phthalate.

20. A laminate comprising a flexible plastic substrate coated with the coating of claim 1.

* * * * *